(12) United States Patent
Kanou (10) Patent No.: US 8,208,956 B2
(45) Date of Patent: Jun. 26, 2012

(54) MULTIBAND RADIO COMMUNICATION DEVICE AND FILTER ACTIVATION CONTROL METHOD

(75) Inventor: Hideto Kanou, Yokohama (JP)

(73) Assignee: Kyocera Corporation, Kyoto (JP)

( * ) Notice: Subject to any disclaimer, the term of this patent is extended or adjusted under 35 U.S.C. 154(b) by 616 days.

(21) Appl. No.: 12/280,525

(22) PCT Filed: Feb. 21, 2007

(86) PCT No.: PCT/JP2007/053221
§ 371 (c)(1),
(2), (4) Date: Dec. 24, 2008

(87) PCT Pub. No.: WO2007/097372
PCT Pub. Date: Aug. 30, 2007

(65) Prior Publication Data
US 2009/0098905 A1 Apr. 16, 2009

(30) Foreign Application Priority Data
Feb. 24, 2006 (JP) ................. P2006-049058

(51) Int. Cl.
*H04M 1/00* (2006.01)
(52) U.S. Cl. ............... 455/552.1; 455/553.1; 455/83; 375/259
(58) Field of Classification Search ........... 455/552.1, 455/553.2, 83; 375/259; 370/254
See application file for complete search history.

(56) References Cited

U.S. PATENT DOCUMENTS

| 6,415,001 B1 * | 7/2002 | Li et al. .................. 375/259 |
| 6,466,768 B1 * | 10/2002 | Agahi-Kesheh et al. ....... 455/78 |
| 6,963,758 B2 * | 11/2005 | Narahashi et al. ............ 455/561 |
| 7,511,687 B2 * | 3/2009 | Kimura ....................... 345/76 |
| 2002/0010772 A1 * | 1/2002 | Kusano ........................ 709/223 |
| 2002/0075059 A1 | 6/2002 | Takahashi ..................... 327/415 |
| 2005/0083856 A1 * | 4/2005 | Morelli et al. ................ 370/254 |

FOREIGN PATENT DOCUMENTS

| JP | 07-336267 | 12/1995 |
| JP | 11-112382 | 4/1999 |
| JP | 2002-176375 | 6/2002 |
| JP | 2003-152588 | 5/2003 |
| JP | 2003-273687 | 9/2003 |
| JP | 2005-051503 | 2/2005 |
| JP | 2005-167639 | 6/2005 |
| JP | 2005-277692 | 10/2005 |

OTHER PUBLICATIONS

Chinese language office action dated Jul. 20, 2011 and its English language translation for corresponding Chinese application 200780006600.7.

* cited by examiner

*Primary Examiner* — Danh Le
(74) *Attorney, Agent, or Firm* — DLA Piper LLP (US)

(57) ABSTRACT

A multiband radio communication device according to the present invention comprises: a radio communication unit configured to transmit a first radio signal in a first frequency band and to receive a second radio signal in a second frequency band different from the first frequency band; a filter connected to the radio communication unit and configured to attenuate the first radio signal; a switch configured to disconnect the filter from the radio communication unit; a communication data determination unit configured to determine a condition of communication data transmitted or received via the radio communication unit; and a switch controller configured to operate the switch, on the basis of the condition of the communication data determined by the communication data determination unit.

5 Claims, 6 Drawing Sheets

| DATA RATE / PRIMARY PATH FREQUENCY BAND | TRANSMISSION POWER THRESHOLD VALUE [dBm] | |
|---|---|---|
| | 800MHz BAND | 2GHz BAND |
| ~ 64.0 [Kbps] | 9.0 | 15.0 |
| ~ 153.6 [Kbps] | 8.5 | 14.5 |
| ~ 153.6 [Kbps] | 8.5 | 14.5 |
| ~ 307.2 [Kbps] | 8.0 | 14.0 |
| ~ 614.4 [Kbps] | 7.5 | 13.5 |
| ~ 1228.8 [Kbps] | 7.0 | 13.0 |
| ~ 2457.6 [Kbps] | 6.5 | 12.5 |

FIG. 6

| QoS CONTROL / PRIMARY PATH FREQUENCY BAND | RECEPTION POWER THRESHOLD VALUE [dBm] | |
|---|---|---|
| | 800MHz BAND | 2GHz BAND |
| QoS CONTROL APPLIED | −80.0 | −86.0 |
| QoS CONTROL NOT APPLIED | −85.0 | −91.0 |

FIG. 7

MULTIBAND RADIO COMMUNICATION DEVICE AND FILTER ACTIVATION CONTROL METHOD

CROSS-REFERENCE TO THE RELATED APPLICATIONS

This application is a national stage of international application No. PCT/JP2007/053221 filed Feb. 21, 2007, which also claims benefit of priority under 35 USC 119 to Japanese Patent Application No. 2006-049058 filed Feb. 24, 2006, the entire contents of which are incorporated herein by reference.

TECHNICAL FIELD

The present invention relates to a multiband radio communication device that prevents noise in different frequency bands from entering into a receiving circuit by use of a filter in a case where multiple radio signals in different frequency bands are transmitted and received simultaneously. The present invention also relates to a filter activation control method of controlling activation of the filter.

BACKGROUND ART

Nowadays, various mobile communication systems are put to practical use along with the advancement of radio communication technologies. For example, mobile communication systems compliant with schemes such as PDC, CDMA and PHS are put to practical use in Japan.

Along with the practical use of various mobile communication systems, multiband radio communication devices (such as cellular phone terminals) supporting multiple frequency bands (multiband) have been provided. Specifically, a multiband radio communication device is capable of transmitting and receiving simultaneously multiple radio signals in different frequency bands.

In a multiband radio communication device, in order to prevent a radio signal in a certain frequency band from entering, as noise, into a receiver circuit for receiving a radio signal in a different frequency band, a filter that suppresses the noise is provided in general (refer to Japanese Patent Application Publication No. Hei 11-112382 (pages 4 to 5 and FIG. 1) for example).

DISCLOSURE OF THE INVENTION

However, the following problem exists in the aforementioned conventional multiband radio communication devices. Specifically, an insertion loss of the receiving circuit increases in a case where the filter is provided, so that there is a problem that a receiving sensitivity is deteriorated.

In this respect, the present invention is made in view of the aforementioned circumstance. An object of the present invention is to provide a multiband radio communication device capable of effectively suppressing noise in different frequency bands from entering into a receiving circuit by use of a filter and of improving a receiving sensitivity, in a case where multiple radio signals in different frequency bands are transmitted and received simultaneously. An object of the present invention is to provide a filter activation control method of controlling activation of the filter.

In order to solve the aforementioned problem, the present invention includes the following aspects. According to a first aspect of the present invention, a multiband radio communication device (cellular phone terminal 100) comprises: a radio communication unit (primary radio communication unit 100P and secondary radio communication unit 100S) configured to transmit a first radio signal in a first frequency band (800 MHz band, for example) and also to receive a second radio signal in a second frequency band (2 GHz band, for example) different from the first frequency band; a filter (noise suppression filter 152A, for example) connected to the radio communication to unit and configured to attenuate the first radio signal; a switch (Switch 151A, for example) configured to disconnect the filter from the radio communication unit, a communication data determination unit (controller 161) configured to determine a condition of communication data transmitted or received via the radio communication unit; and a switch controller (controller 161) configured to operate the switch, on the basis of the condition of the communication data determined by the communication data determination unit.

According to the aforementioned multiband radio communication device, the filter configured to attenuate power of the first radio signal is disconnected from the radio communication unit on the basis of a condition of communication data transmitted or received via the radio communication unit. Since the filter is disconnected from the radio communication unit, an insertion loss of a receiving circuit in the radio communication unit can be reduced.

Moreover, in a case where it is determined on the basis of the condition of the communication data that the power of the first radio signal needs to be attenuated by the filter, the filter is connected to the radio communication unit. Accordingly, noise in a different frequency band can be effectively prevented from entering into the receiving circuit.

A second aspect of the present invention is related to the first aspect of the invention and is summarized as the multiband radio communication device wherein the communication data determination unit determines a transmission rate of the communication data, and the switch controller operates the switch, on the basis of the transmission rate determined by the communication data determination unit.

A third aspect of the present invention is related to the second aspect of the invention and is summarized as the multiband radio communication device wherein the switch controller operates the switch in a case where a transmission power value of the first radio signal exceeds a predetermined threshold value associated with the transmission rate determined by the communication data determination unit.

A fourth aspect of the present invention is related to the first aspect of the invention and is summarized as the multiband radio communication device wherein the communication data determination unit makes determination as to whether or not a priority control for the communication data is applied, and the switch controller operates the switch, on the basis of the determination made by the communication data determination unit as to whether or not the priority control is applied.

A fifth aspect of the present invention is related to the fourth aspect of the invention and is summarized as the multiband radio communication device wherein the switch controller operates the switch in a case where a reception power value of the first radio signal exceeds a predetermined threshold value associated with the determination made as to whether or not a priority control is applied by the communication data determination unit.

A sixth aspect of the present invention is related to any one of the first to fifth aspects of the invention and is summarized as the multiband radio communication device wherein the radio communication unit at least includes: a first radio communication unit configured to transmit the first radio signal; and a second radio communication unit configured to receive the second radio signal, wherein the filter is connected to the second radio communication unit via the switch.

A seventh aspect of the present invention is related to the sixth aspect of the invention and is summarized as the multiband radio communication device further comprised a second radio antenna (secondary antenna 143) connected to the second radio communication unit via a connection line (connection line 143L), wherein the filter is connected to the connection line via the switch.

An eighth aspect of the present invention is a filter activation control method using a radio communication unit configured to transmit a first radio signal in a first frequency band and also to receive a second radio signal in a second frequency band different from the first frequency band, and a filter connected to the radio communication unit via a switch and configured to attenuate the first radio signal. The filter activation control method comprises the steps of: determining (step S40, for example) a condition of communication data transmitted or received via the radio communication unit; and disconnecting (step S80, for example) the filter from the radio communication unit by operating the switch, on the basis of the condition of the communication data determined in the step of determining.

A ninth aspect of the present invention is related to the eighth aspect of the invention and is summarized as the filter activation control method wherein a transmission rate of the communication data is determined in the step of determining, and in the step of disconnecting, the filter is disconnected from the radio communication unit by operating the switch, on the basis of the transmission rate determined in the step of determining.

A tenth aspect of the present invention is related to the ninth aspect of the invention and is summarized as the filter activation control method wherein the filter is disconnected from the radio communication unit in the step of disconnecting in a case where a transmission power value of the first radio signal exceeds a predetermined threshold value associated with the transmission rate determined in the step of determining.

An eleventh aspect of the present invention is related to the eighth aspect of the invention and is summarized as the is filter activation control method wherein the determination is made as to whether or not a priority control for the communication data is applied in the step of determining, and in the step of disconnecting, the filter is disconnected from the radio communication unit by operating the switch, on the basis of the determination made as to whether or not the priority control is applied in the step of determining.

A twelfth aspect of the present invention is related to the eleventh aspect of the invention and is summarized as the filter activation control method wherein the filter is disconnected from the radio communication unit in the step of disconnecting, in a case where a reception power value of the first radio signal exceeds a predetermined threshold value associated with the determination made as to whether or not the priority control is applied in the step of determining.

According to the aspects of the present invention, it is a possible to provide a multiband radio communication device and a filter activation control method that can effectively suppress noise in a different frequency band from entering into a receiving circuit by use of a filter and improve a receiving sensitivity, in a case where multiple radio signals in different so frequency bands are transmitted and received simultaneously.

BEST MODE FOR CARRYING OUT THE INDENTION

Next, an embodiment of the present invention will be described. Note that the same or similar portions are denoted by the same or similar reference numerals in the descriptions in the drawings below. It should be noted that the drawings is are schematic, and that ratios of respective dimensions and the like are different from the actual ones.

Accordingly, specific dimensions and the like should be determined in consideration of the descriptions below. As a matter of course, there are some parts between each of the drawings in which some of the dimensional relations and ratios are different.

(Overall Schematic Configuration of Multiband Radio Communication Device)

Figure 1:
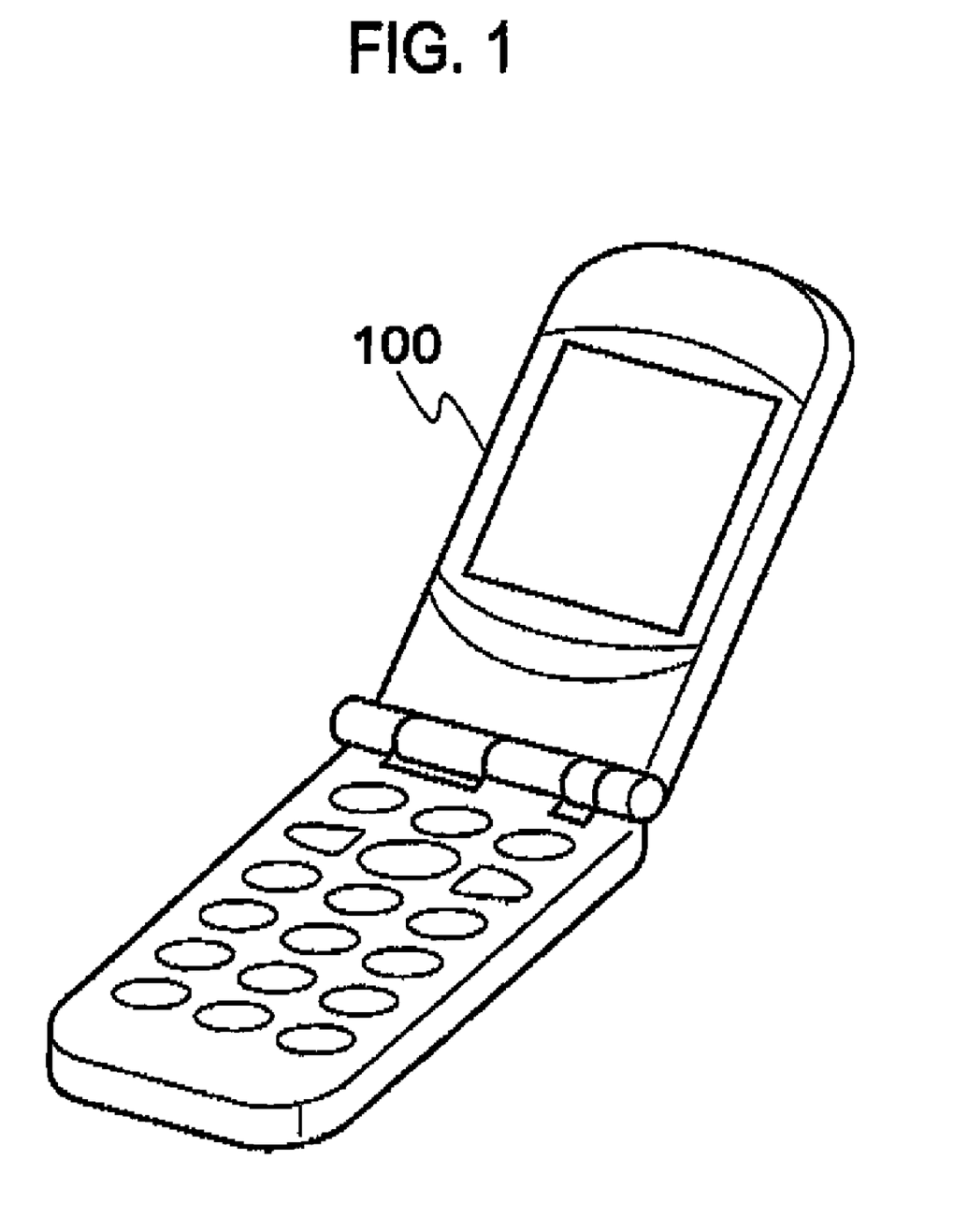
FIG. 1 shows an overall schematic perspective view of is a multiband radio communication device according to an embodiment of the present invention.

FIG. 1 shows an overall schematic perspective view of a cellular phone terminal 100 that constitutes a multiband radio communication device according to a present embodiment.

The cellular phone terminal 100 is used in a mobile communication system compliant with a CDMA scheme. The cellular phone terminal 100 is capable of transmitting and receiving radio signals in the 800 MHz band and 2 GHz band simultaneously (so-called, "hybrid mode").

In addition, the cellular phone terminal 100 is capable of receiving a GPS signal (1.5 GHz) in order to acquire position information on the cellular phone terminal 100.

Moreover, the cellular phone terminal 100 is capable of executing high speed data communications compliant with a 1xEVDO (Evolution-Data only) scheme. Furthermore, the cellular phone terminal 100 is provided with a diversity reception function for the 800 MHz band and 2 GHz band in order to improve throughputs of the data communications and to execute an operation in the hybrid mode.

(Logical Block Configuration of Multiband Radio Communication Device)

Figure 2:
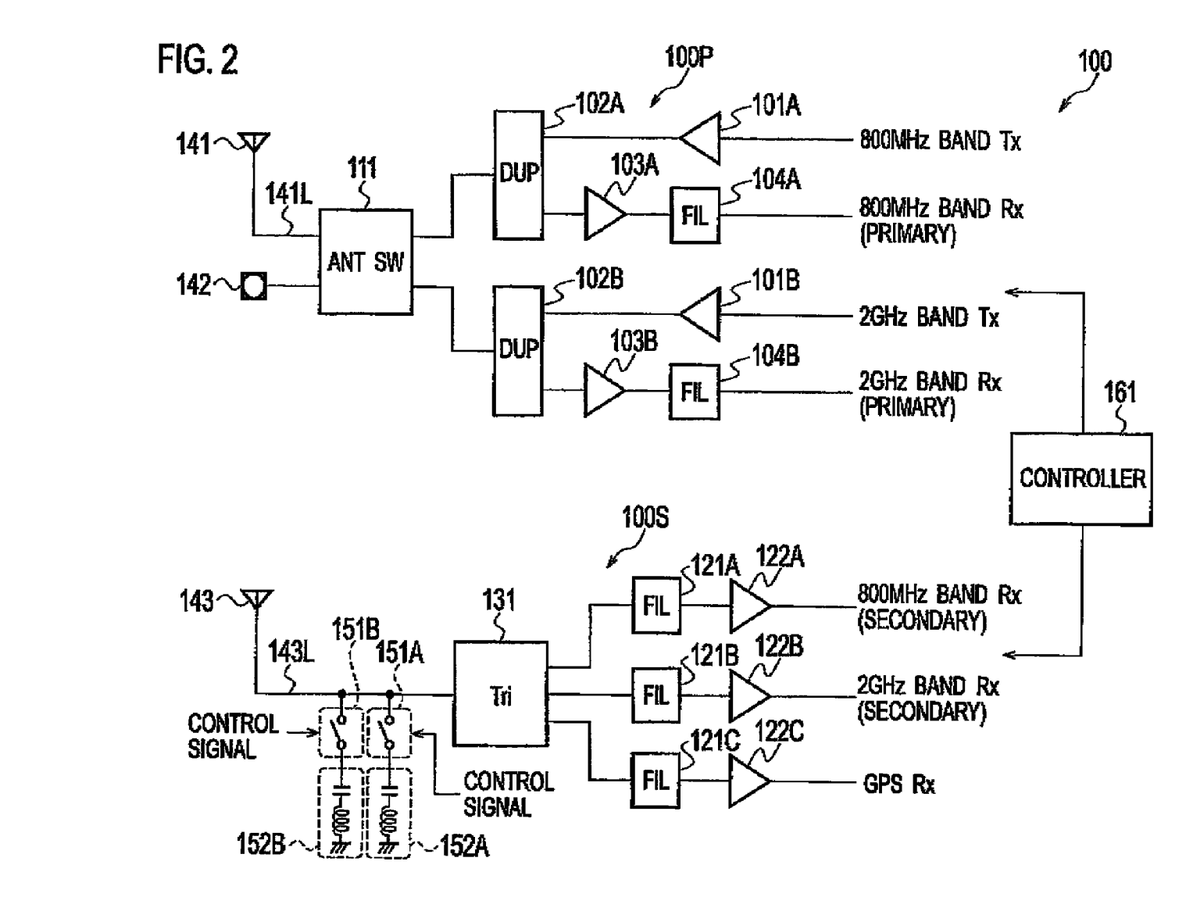
FIG. 2 shows a logical block configuration diagram of the multiband radio communication device according to the embodiment of the present invention.

FIG. 2 shows a logical block configuration diagram of the cellular phone terminal 100 (multiband radio communication terminal). As shown in FIG. 2, the cellular phone terminal 100 includes a primary radio communication unit 100P and a secondary radio communication unit 100S.

The primary radio communication unit 100P includes a function to transmit and receive radio signals in the 800 MHz band and the 2 GHz band.

The secondary radio communication unit 100S includes a function to receive the 800 MHz band, the 2 GHz band and a GPS signal. The secondary radio communication unit 100S does not include a function to transmit a radio signal.

It should be noted that hereinafter, a description will be given of portions related to the present invention. Accordingly, it should be noted that there is a case where the cellular phone terminal 100 includes a logical block (such as a power supply), which is essential to perform functions as the cellular phone terminal 100, although such a logical block is not shown in the drawings, or the description thereof is omitted.

(1) Primary Radio Communication Unit 100P

The primary radio communication unit 100P includes a power amplifier 101A, a duplexer 102A, a low noise amplifier 103A and a band-pass filter 104A in order to transmit and receive a radio signal in the 800 MHz band (a first radio signal). In this embodiment, the primary radio communication unit 100P constitutes a first radio communication unit that transmits the first radio signal in a first frequency band (the 800 MHz band).

In addition, the primary communication unit 100P includes a power amplifier 101B, a duplexer 102B, a low noise amplifier 103B and a band-pass filter 104B in order to transmit and receive a radio signal in the 2 GHz band.

The power amplifier 101A amplifies a transmitted radio signal in the 800 MHz up to a predetermined power level. The duplexer 102A separates a transmitted radio signal and a received radio signal in the 800 MHz band from each other.

The low noise amplifier 130A amplifies a received radio signal in the 800 MHz band while keeping additional noise of the received radio signal small, the signal being outputted from the duplexer 102B. The band-pass filter 104A removes a radio is signal in a frequency band other than the 800 MHz band (unnecessary wave).

The power amplifier 101B, the duplexer 102B, the low noise amplifier 103B and the band-pass filter 104B support a radio signal in the 2 GHz band, and include the same functions as those of the aforementioned duplexer 102A, the low noise amplifier 103A and the band-pass filter 104A.

In addition, an antenna switch 111 is connected to the primary radio communication unit 100P. The antenna switch 111 is a switch for sharing a primary antenna 141 and a measurement connector 142 between the radio signals in the 800 MHz band and the 2 GHz band.

The primary antenna 141 is connected to the antenna switch 111 via a connection line 141L.

(2) Secondary Radio Communication Unit 100S

The secondary radio communication unit 100S includes a receiving circuit that receives the 800 MHz band, the 2 GHz band and a OPS signal (1.5 GHz band). In this embodiment, the secondary radio communication unit 100S constitutes a second radio communication unit that receives a second radio signal in a second frequency band (2 GHz band), which is different from the first frequency band (800 MHz band).

Specifically, the secondary radio communication unit 100S includes a band-pass filter 121A and a low noise amplifier 122A in order to receive a radio signal in the 800 MHz band.

Moreover, the secondary radio communication unit 100S includes a band-pass filter 121B and a low noise amplifier 122B in order to receive a radio signal in the 2 GHz band. The secondary radio communication unit 100S also includes a band-pass filter 121C and a low noise amplifier 122C in order to receive a GPS signal (1.5 GHz band).

In addition, the secondary radio communication unit 100S includes a frequency demultiplexer 131 in order to share a secondary antenna 143 for receiving signals between the 800 MHz band, the 2 GHz band and a GPS.

The band-pass filter 121A removes a radio signal in a frequency band other than the 800 MHz band (unnecessary frequency). The low noise amplifier 122A amplifies a received a radio signal while keeping additional noise of the received radio signal in the 800 MHz small, the signal being outputted from the frequency demultiplexer 131.

The band-pass filter 121B and the low noise amplifier 122B to support a received radio signal in the 2 GHz band and include the same functions as those of the aforementioned the band-pass filter 121A and the low noise amplifier 122A, respectively.

The band-pass filter 121C and the low noise amplifier 122C support a OPS signal and include the same functions as those of the aforementioned the band-pass filter 121A and the low noise amplifier 122A, respectively.

A secondary antenna 143 (a second radio antenna) is connected to the frequency demultiplexer 131 via a connection line 143L.

In addition, one ends of a switch 151A and a switch 151B are connected to the connection line 143L. A noise suppression filter 152A is connected to the other end of the switch 151A. A noise suppression filter 152B is connected to the other end of the switch 151B.

The switch 151A allows the noise suppression filter 152A to be disconnected from the secondary radio communication unit 100S. Specifically, the switch 151A connects or disconnects the noise suppression filter 152A to and from the secondary radio communication unit 100S on the basis of a control signal from a controller 161

The noise suppression filter 152A is connected to the secondary radio communication unit 100S via the switch 151A and attenuates radio signal (the first radio signal) components in the 800 MHz band, the components being included in a received radio signal. One end of the noise suppression filter 152A is connected to the switch 151A and the other end thereof is connected to the ground.

The switch 151B allows the noise suppression filter 152B to be disconnected from the secondary radio communication unit 100S. Specifically, the switch 151B connects or disconnects the noise suppression filter 152B to and from the secondary radio communication unit 100S on the basis of a control signal from the controller 161.

The noise suppression filter 152B is connected to the secondary radio communication unit 100S via the switch 151B and attenuates radio signal components in the 2 GHz band, the components being included in a received radio signal. One end of the noise suppression filter 152B is connected to the switch 151B and the other end thereof is connected to the ground.

(3) Controller 161

The controller 161 controls each logical block constituting the cellular phone terminal 100. In particular, in this embodiment, the controller 161 determines a condition of communication data transmitted or received via the primary radio communication unit 100P and the secondary radio communication unit 100S (radio communication units). In this embodiment, the controller 161 constitutes a communication data determination unit.

Specifically, the controller 161 is capable of determining a transmission rate (data rate) of the communication data to be transmitted or received. In addition, the controller 161 is capable of making the determination as to whether or not a priority control (QoS control) for the communication data is applied.

Moreover, the controller 161 operates the switch 115A or the switch 151B on the basis of the determined condition of the communication data. In this embodiment, the controller 161 constitutes a switch controller.

Specifically, the controller 161 operates the switch 151A or the switch 151B on the basis of the determined transmission rate.

Figure 5:
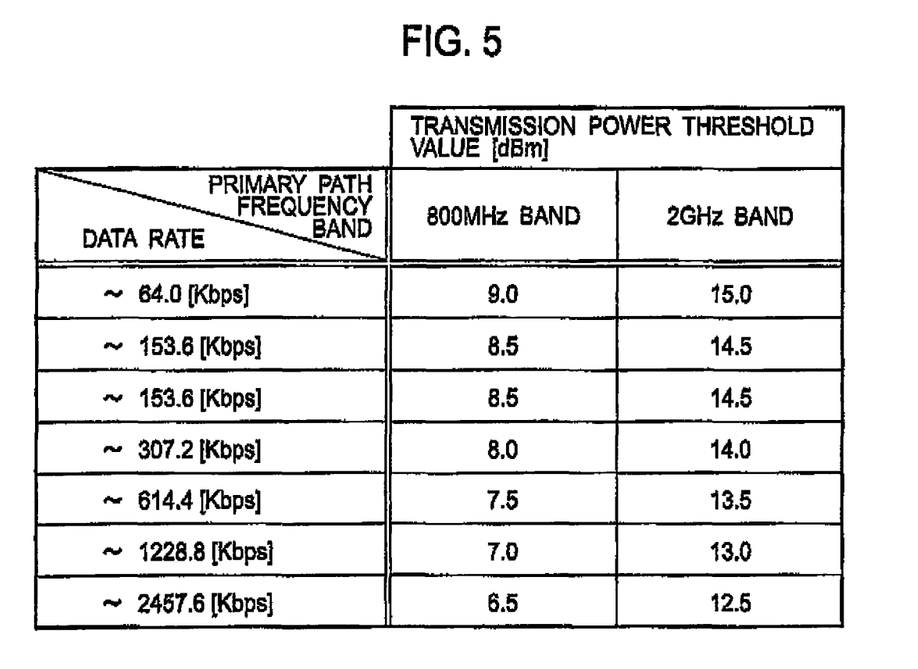
FIG. 5 is a diagram showing an example of a data rate table used in the multiband radio communication device according to the embodiment of the present invention.

For example, the controller 161 disables the noise suppression filter 152A from suppressing a radio signal in the 800 MHz band by setting the switch 151A to be in a non-conduction state (OFF) in a case where a transmission power of the radio signal (the first radio signal) in the 800 MHz band associated with the determined transmission rate is not more than a predetermined threshold value (refer to FIG. 5). The controller 161 enables the noise suppression filter 152A to suppress a radio signal in the 800 MHz band by setting the switch 151A to be in a conduction state (ON) in a case where the transmission power exceeds the predetermined threshold value.

In addition, the controller 161 operates the switch 151A or the switch 151B on the basis of the presence or absence of is the determined priority control.

Figure 6:
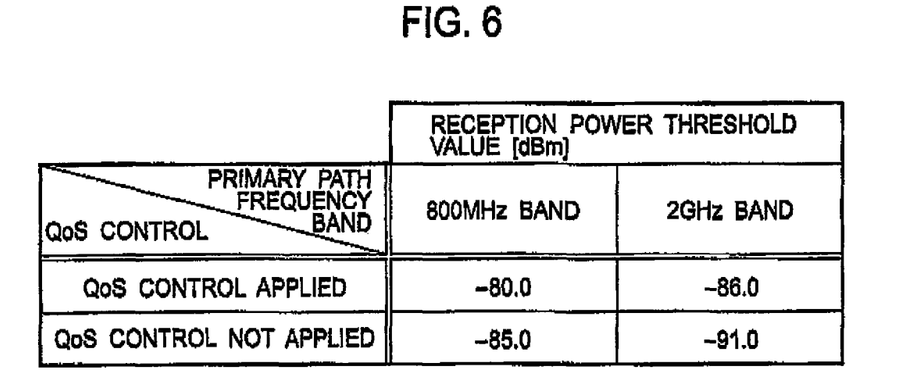
FIG. 6 is a diagram showing an example of a QoS table used in the multiband radio communication device according to the embodiment of the present invention.

For example, the controller 161 disables the noise suppression filter 152A from suppressing a radio signal in the 800 MHz band by setting the switch 151A to be in a non-conduction state (OFF) in a case where a reception power from the radio signal (the first radio signal) in the 800 MHz band associated with the presence or absence of the determined priority control exceeds a predetermined threshold value (refer to FIG. 6). The controller 161 enables the noise suppression filter 152A to suppress a radio signal in the 800 MHz band by setting the switch 151A to be in a conduction state (ON) in a case where the reception power is not more than the predetermined threshold value.

It should be noted that the controller 161 is also capable of disabling the noise suppression filter 152B from suppressing a radio signal in the 2 GHz band by setting the switch 151B to be in a non-conduction state in a case where the transmission power value of a radio signal in the 2 GHz band is not more than a predetermined threshold value, or in a case where the reception power value of a radio signal in the 20 Hz band exceeds a predetermined value. The controller 161 is also capable of enabling the noise suppression filter 152B to suppress a radio signal in the 2 GHz by setting the switch 151B to be in a conduction state in a case where the transmission power value of a radio signal in the 2 GHz band exceeds a predetermined threshold value, or in a case where the reception power value of a radio signal in the 2 GHz band is not more than a predetermined threshold value.

(Operation of Multiband Radio Communication Device)

Next, a description will be given of an operation of the aforementioned cellular phone terminal 100 (a multiband radio communication device). Specifically, (1) the description will be given of a control operation of the switches (the switches 151A and 151B) on the basis of a transmission rate of communication data, and (2) a control operation of the switches on the basis of the presence or absence of a priority control for communication data.

(1) Control of Switch, on the Basis of Transmission Rate of Communication Data

Figure 3:
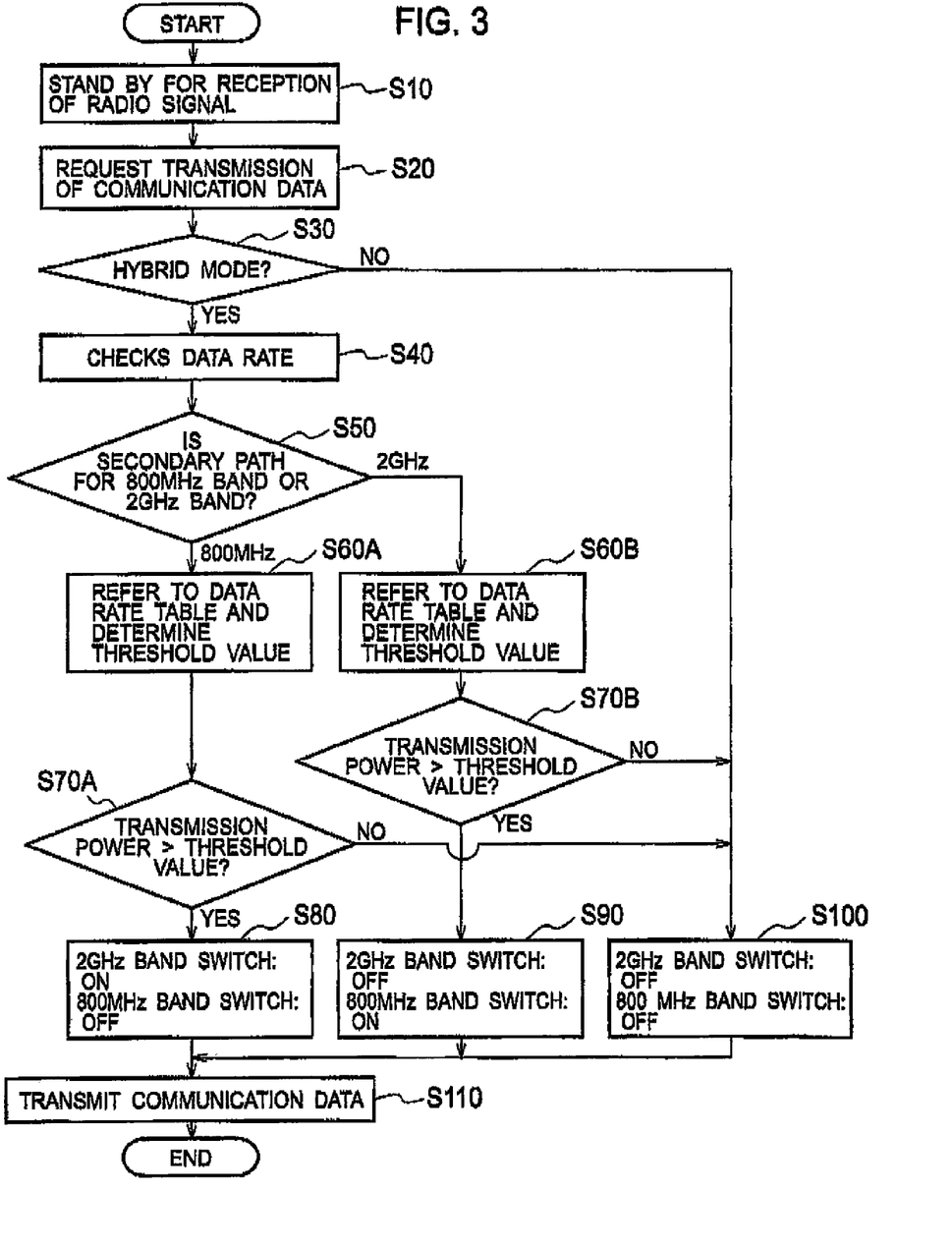
FIG. 3 shows an operation flowchart of the multiband radio communication device according to the embodiment of the present invention.

FIG. 3 shows a control operation flow for the switches (the switches 151A and 151B) on the basis of a transmission rate (a data rate) of communication data transmitted via the cellular phone terminal 100.

In step S10, the cellular phone terminal 100 stands by for reception of a radio signal (the 800 MHz band, the 2 GHz band and a GPS signal).

In step S20, the cellular phone terminal 100 requests transmission of communication data.

In step S30, the cellular phone terminal 100 determines whether or not the operation mode of the cellular phone terminal 100 is the hybrid mode, that is, a mode in which the cellular phone terminal 100 transmits and receives radio signals in the 800 MHz band and the 2 GHz band simultaneously.

In a case where the operation mode is in the hybrid mode (YES in step S30), the cellular phone terminal 100 checks the data rate of communication data in step S40.

in step S50, the cellular phone terminal 100 determines whether the secondary path is for the 800 MHz band or the 2 GHz band. Specifically, the cellular phone terminal 100 determines whether the radio signal to be received by use of the secondary radio communication unit 100S is in the 800 MHz band or the 2 GHz band.

In a case where the secondary path is for the 800 MHz band a (the 800 MHz in step S50), in step S60A, the cellular phone terminal 100 refers to a data rate table and determines a transmission power threshold value of a transmitted radio signal in the 2 GHz band transmitted by the primary radio communication unit 100P.

FIG. 5 shows an example of the data rate table, here. As shown in FIG. 5, the data rate table is formed of data rates, primary path frequency bands and transmission power threshold values.

For example, in a case where the secondary path is for the 800 MHz band, and the data rate of communication data to be transmitted by the primary radio communication unit 100P is approximately 2,000 kbps, the transmission power threshold value of a transmitted radio signal in the 2 GHz band transmitted by the primary radio communication unit 100P is determined to be 12.5 dBm.

In step S70A, the cellular phone terminal 100 determines whether or not the transmission power of the transmitted radio signal in the 2 GHz band transmitted by the primary radio communication unit 100P exceeds the determined transmission power threshold value.

In a case where the transmission power of the transmitted radio signal in the 2 GHz band exceeds the transmission power threshold value (YES in step S70A), the cellular phone terminal a 100 turns OFF the switch 151A connected to the noise suppression filter 152A that suppresses a radio signal in the 800 MHz band. On the other hand, the cellular phone terminal 100 turns ON the switch 151B connected to the noise suppression filter 152B that suppresses a radio signal in the 2 GHz band.

In a case where the secondary path is for the 2 GHz band (the 2 GHz in step S50), in step S60B, the cellular phone terminal 100 refers to a data rate table and determines a transmission power threshold value of a transmitted radio signal in the 800 MHz band transmitted by the primary radio communication unit 100P.

For example, in a case where the secondary path is for the 2 GHz band, and the data rate of communication data to be transmitted by the primary radio communication unit 100P is approximately 2,000 kbps, the transmission power threshold value of a transmitted radio signal in the 800 MHz band transmitted by the primary radio communication unit 100P is determined to be 6.5 dBm.

In step S70B, the cellular phone terminal 100 determines whether or not the transmission power of a transmitted radio signal in the 800 MHz transmitted by the primary radio communication unit 100P exceeds the determined transmission power threshold value.

In a case where the transmission power of the transmitted a radio signal in the 800 MHz band exceeds the transmission power threshold value (YES in step S70B), in step S90, the cellular phone terminal 100 turns OFF the switch 151B connected to the noise suppression filter 152B that suppresses a radio signal in the 2 GHz band. On the other hand, the cellular phone to terminal 100 turns ON the switch 151A connected to the noise suppression filter 152A that suppresses a radio signal in the 800 MHz band.

In step Sloe, the cellular phone terminal 100 turns OFF is the switch 151B connected to the noise suppression filter 152B that suppresses a radio signal in the 2 GHz band in a case where the operation thereof is not in the hybrid mode (No in step S30), where the transmission power of a transmitted radio signal in the 2 GHz band is not more than the transmission power threshold value (NO in step S70A) or where the transmission power of a transmitted radio signal in the 800 MHz band is not more than the transmission power threshold value (NO in step S70B). Moreover, the cellular phone terminal 100 also turns OFF the switch 151A connected to the noise suppression filter 152A that suppresses a radio signal in the 800 MHz band.

In step S110, the cellular phone terminal 100 transmits, using the primary radio communication unit 100P, the communication data requested to be transmitted in step S20.

Figure 4:
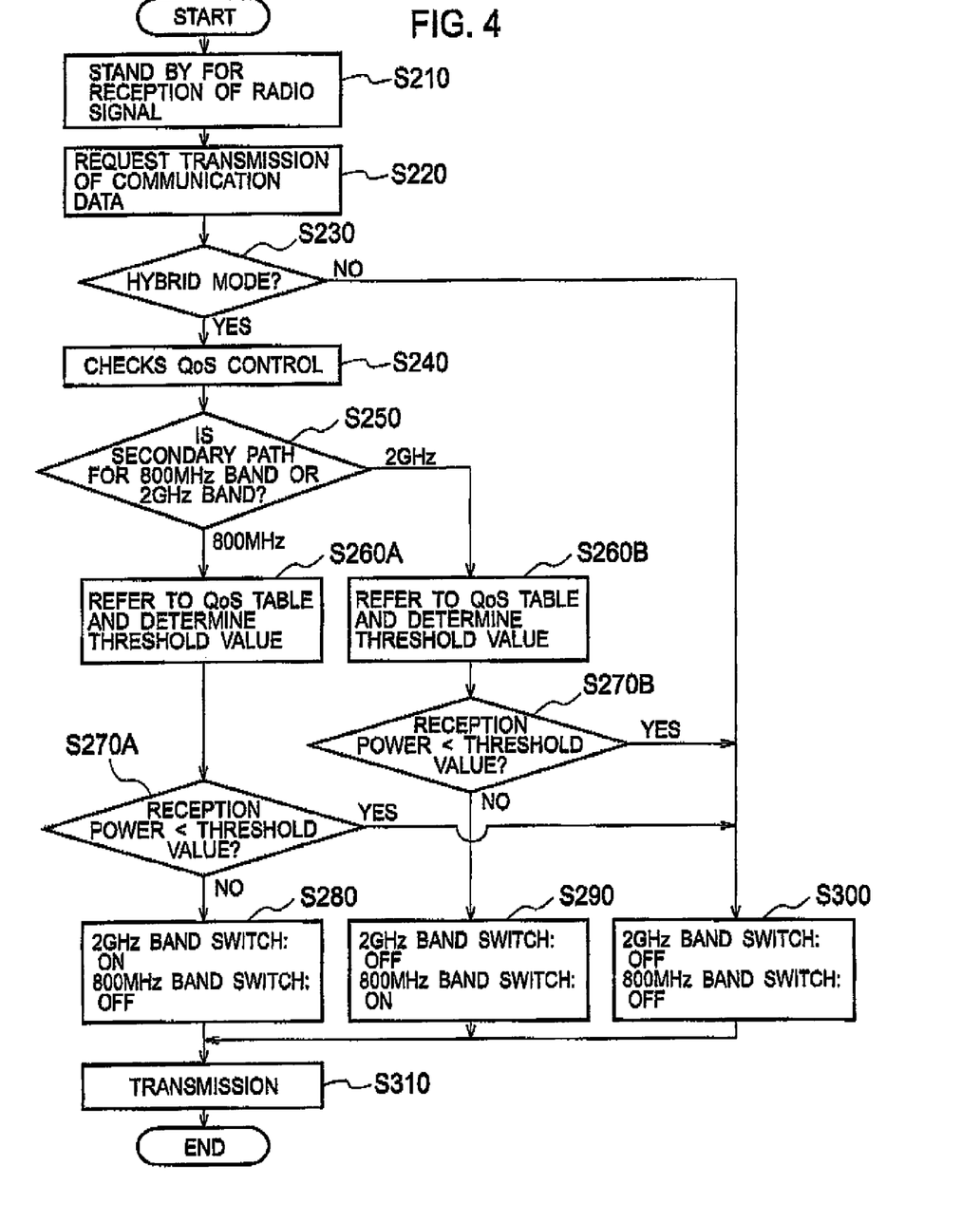
FIG. 4 shows an operation flowchart of the multiband radio communication device according to the embodiment of the present invention.

(2) Control of Switch, on the Basis of Presence or Absence of Priority Control for Communication Data FIG. 4 shows a control operation flow for the switches (the switches 151A and 151B) on the basis of the presence or absence of a priority control (a QoS control) for communication to data transmitted via the cellular phone terminal 100. Hereinafter, a description will be mainly given of portions that are different from the switch control operation flow on the basis of the transmission rate (data rate) of the communication data shown in FIG. 3.

The processings in steps S210 to S230 are the same as those in aforementioned steps S10 to S30.

In a case where the operation mode is the hybrid mode (YES in step S230), in step S240, the cellular phone terminal 100 checks whether a QoS control for communication data to be transmitted is applied or not applied.

The cellular phone terminal 100 determines whether the secondary path is for the 800 MHz band or for the 2 GHz band in step S250.

In a case where the secondary path is for the 800 MHz band MHz band in step S250), the cellular phone terminal 100 refers to a QoS table and determines the reception power threshold value of a received radio signal in the 2 GHz band a in step S260A.

FIG. 6 shows an example of the QoS table, here. As shown in FIG. 6, the QoS table is formed of QoS control, primary path frequency bands and reception power threshold values.

For example, in a case where the secondary path is for the 800 MHz band, and the QoS control for the communication data to be transmitted by the primary radio communication unit 100P is set to be present, the reception power threshold value of a received radio signal in the 2 GHz band is determined to be −86.0 dBm.

In step S270A, the cellular phone terminal 100 determines whether the reception power of the received radio signal in the 2 GHz band is smaller than the determined reception power threshold value.

In a case where the reception power of the received radio signal in the 2 GHz band is smaller than the determined reception power threshold value (YES in step S270A), in step S280, the cellular phone terminal 100 turns OFF the switch 151A connected to the noise suppression filter 152A that suppresses a radio signal in the 800 MHz band. On the other hand, the cellular phone terminal 100 turns ON the switch 151B connected to the noise suppression filter 152B that suppresses a radio signal in the 2 GHz band.

In a case where the secondary path is for the 2 GHz band (2 GHz band in step S250), in step S260B, the cellular phone terminal 100 refers to the QoS table and determines the reception power threshold value of a received radio signal in the 800 MHz band.

For example, in a case where the secondary path is for the 2 GHz band, and the QoS control for the communication data to be transmitted by the primary radio communication unit 100P is set to be not applied, the reception power threshold value of a received radio signal in the 800 MHz band is determined to be −85.0 dBm.

In step S270B, the cellular phone terminal 100 determines whether the reception power of the received radio signal in the 800 MHz is smaller than the determined reception power threshold value.

In a case where the reception power from the received radio signal in the 800 MHz band is smaller than the reception power threshold value (YES in step S270B), in step S290, the cellular phone terminal 100 turns OFF the switch 151B connected to the noise suppression filter 152B that suppresses a radio signal in the 2 GHz band. On the other hand, the cellular phone terminal 100 turns ON the switch 251A connected to the noise suppression filter 152A that suppresses a radio signal in the 800 MHz band.

The processings of steps S300 and S310 are the same as that of aforementioned steps S100 and S110.

Effects and Advantages

According to the cellular phone terminal 100 (a multiband so radio communication device), the noise suppression filter 152A (or the noise suppression filter 152B) is disconnected from the secondary radio communication unit 100S on the basis of a condition of communication data (a data rate, or the presence or absence of QoS control) transmitted or received via the is primary radio communication unit 100P or the secondary radio communication unit 100S (a radio communication unit).

Since the noise suppression filter 152A (or the noise suppression filter 152B) is disconnected from the secondary radio communication unit 100S, an insertion loss of the receiving circuit in the secondary radio communication unit 100S can be reduced.

Moreover, in a case where it is determined, on the basis of a condition of the communication data, that the power of the radio signal needs to be attenuated by the noise suppression filter 152A (or the noise suppression filter 152B) the applicable noise suppression filter is connected to the secondary radio communication unit 100S. For this reason, it is possible to effectively prevent noise in a different frequency band from entering into the receiving circuit in the secondary radio communication unit 100S.

Furthermore, according to the present embodiment, it is determined, on the basis of a transmission power threshold value (refer to FIG. 5) associated with a data rate of communication data, or on the basis of a reception power threshold value (refer to FIG. 6) associated with the presence or absence of a QoS control for the communication data, that the noise suppression filter 152A (or the noise suppression filter 152B) should be connected to the secondary radio communication unit 100S or not.

For this reason, in contrast to a case where it is determined, simply on the basis of the transmitted and reception powers, whether or not the applicable noise suppression filter should connected to the secondary radio communication unit 100S, it is possible to control the applicable noise suppression filter, in a more detailed manner, whether or not to connect to the secondary radio communication unit 100S.

In addition, in the present embodiment, the noise suppression filter 152A (or the noise suppression filter 152B) is connected to the secondary radio communication unit 100S via the switch 151A (switch 151B). Specifically, the applicable noise suppression filter is connected to the connection line 143L via the switch.

Specifically, since the applicable noise suppression filter is arranged at a forward position of the frequency demultiplexer 131, the circuit can be shared in contrast to a case where the noise suppression filter is arranged for each frequency band independently at a backward position of the frequency demultiplexer 131. Accordingly, such a configuration contributes to reduction in size or weight of the cellular phone terminal 100.

Other Embodiments

As described above, the content of the present invention has been disclosed through one embodiment of the present invention. However, the descriptions and the drawings constituting a part of the disclosure should not be construed to limit the present invention. Various alternative embodiments should be obvious to those skilled in the art from this disclosure.

For example, although the switches 151A and 151B, and the noise suppression filters 152A and 152B are arranged in the secondary radio communication unit 100S in the aforementioned embodiment, the switches and the noise suppression filters may be arranged in the primary radio communication unit 100P.

It should be noted that, in a case where the noise suppression filters are arranged in the primary radio communication unit 100P, the applicable one of the noise suppression filters functions to attenuate the frequency band received by the secondary radio communication unit 100S.

Figure 7:
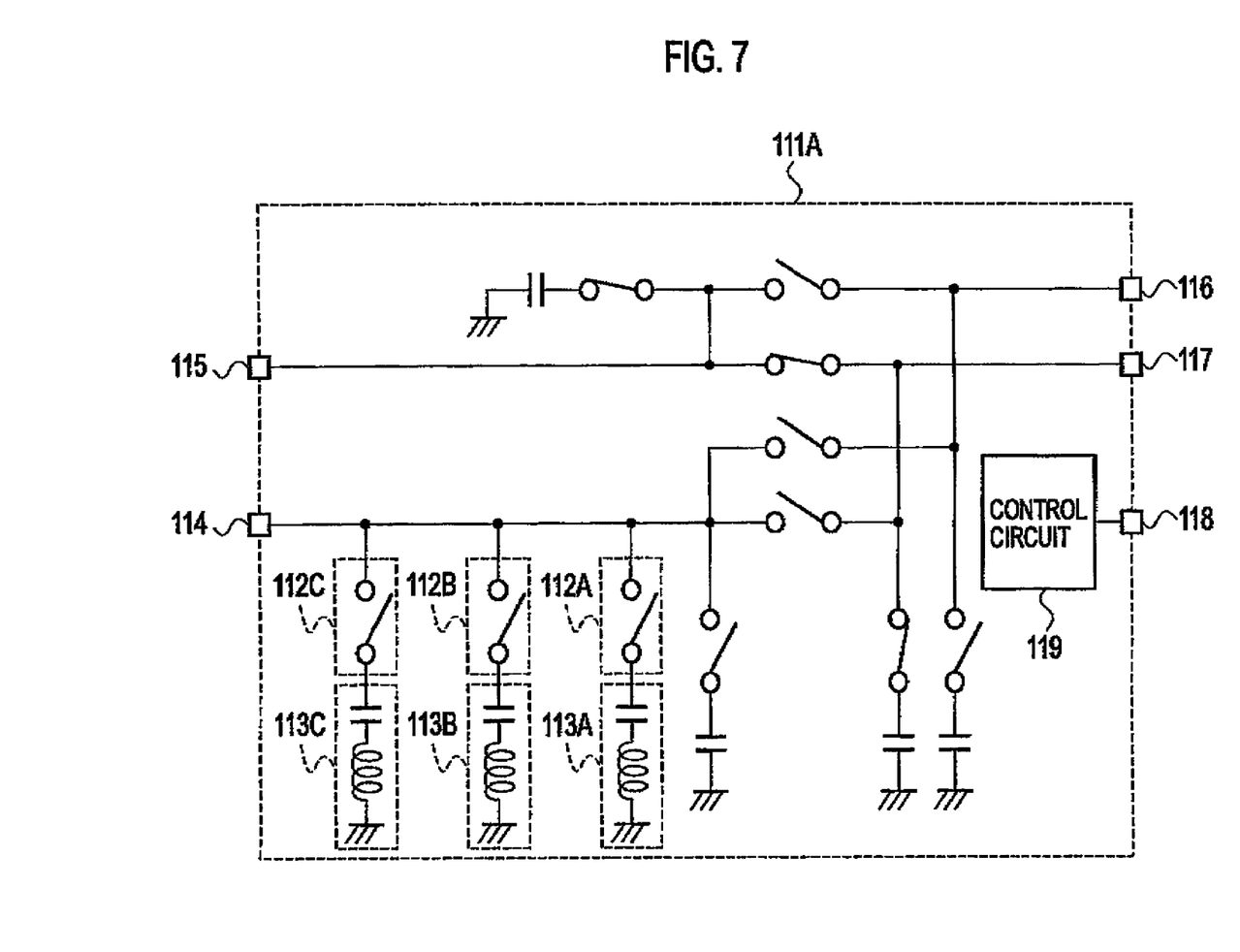
FIG. 7 shows an internal configuration diagram of an antenna switch provided in a multiband radio communication device according to a modification example of the present invention.

FIG. 7 is an internal configuration diagram of an antenna switch 111A constituting the primary radio communication unit 100P according to the modification example. The antenna switch 111A is arranged in the primary radio communication unit 100P instead of the antenna switch 111.

As shown in FIG. 7, the antenna switch 111A includes switches 112A to 112C and noise suppression filters 113A to 113C.

The switch 112A disconnects the noise suppression filter 113A from the primary radio communication unit 100P. Specifically, the switch 112A disconnects the noise suppression filter 113A from the primary radio communication unit 100P on the basis of a control signal from a control circuit 119. It should be noted that the control circuit 119 is connected to the controller 161 (refer to FIG. 2).

The noise suppression filter 113A is connected to the primary radio communication unit 100P (the first radio communication unit) via the switch 112A, and attenuates the power of a transmitted radio signal in the 800 MHz band. Specifically, the noise suppression filter 113A is connected to the primary radio communication unit 100P in a case where a radio signal in the 2 GHz band or the 1.5 GHz band is transmitted by the primary radio communication unit 100P and a radio signal in the 800 MHz band is received by the secondary radio communication unit 100S.

One end of the noise suppression filter 113A is connected to the switch 112A, and the other end thereof is connected to the ground.

In addition, the switch 112B and the noise suppression filter 113B include the same functions as those of the switch 112A and the noise suppression filter 113A, respectively. It should be noted that the noise suppression filter 113B attenuates the power of a transmitted radio signal in the 2 GHz band. Specifically, the noise suppression filter 113B is is connected to the primary radio communication unit 100P in a case where a radio signal in the 800 MHz band or the 1.5 GHz band is transmitted by the primary radio communication unit 100P and a radio signal in the 2 GHz band is received by the secondary radio communication unit 100S.

Furthermore, the switch 112C and the noise suppression filter 113C include the same functions as those of the switch 112A and the noise suppression filter 113A, respectively. It should be noted that the noise suppression filter 113C attenuates the power of a radio signal in the 1.5 GHz band. Specifically, the noise suppression filter 113C is connected to the primary radio communication unit 100P in a case where a radio signal in the 800 MHz band or the 2 GHz band is transmitted by the primary radio communication unlit 100P and a radio signal in the 1.5 GHz band is received by the secondary radio communication unit 100S.

A terminal 114 is a terminal for connecting to the connection line 141L. A terminal 115 is a terminal for connecting to the measurement connector 142.

A terminal 116 is a terminal for connecting to the duplexer 102A. A terminal 117 is a terminal for connecting to the duplexer 102B. In addition, a terminal 118 is a terminal for connecting to the controller 116.

In addition, the primary antenna 141 (a first radio antenna) is connected to the primary radio communication unit 100P via the connection line 141L connected to the terminal 114 and the antenna switch 111A. Specifically, the noise suppression filters 113A to 113C are connected to the connection line 141L via the switches 112A to 112C, respectively.

Although the switch 151A (or the switch 151B) is controlled on the basis of the data rate table (refer to FIG. 5) and the QoS table (refer to FIG. 6) in the aforementioned embodiment, the illustrated data rate table and QoS table are only examples, so that a different configuration may be employed.

For example, the switch 151A (or the switch 151B) may be controlled on the basis of the data rate itself of the communication data instead of the transmission power threshold value associated with the data rate of the communication data.

Likewise, the switch 151A (or the switch 151B) may be controlled on the basis of the presence or absence of a QoS control for the communication data instead of the reception power threshold value associated with the QoS control of the communication data.

Moreover, in the present embodiment, although the description is given of a case where the cellular phone terminal 100 constitutes the multiband radio communication device according to the present invention, the multiband radio communication device may be configured of a card module installed on a personal computer, a mobile information terminal, a car navigation system and the like.

As described, the present invention includes various embodiments not described herein, as a matter of course. The technical scope of the present invention is thus defined only by invention identifying matters according to the scope of claims appropriate to the descriptions above.

It is to be noted that the entire contents of Japanese Patent Application No. 2006-49058 (filed on Feb. 24, 2006) are incorporated herein by reference.

INDUSTRIAL APPLICABILITY

As described above, the multiband radio communication device and the filter activation control method of controlling an operation of a filter according to the present invention are advantageous in radio communications such as mobile communications. This is because the device and the method can effectively prevent, by the minimum usage of the filter, noise in a different frequency band entering into a receiving circuit while improving a receiving sensitivity, in a case where multiple radio signals in different frequency bands are transmitted and received simultaneously.

The invention claimed is:

1. A filter activation control method using a radio communication unit configured to transmit a first radio signal in a first frequency band and also to receive a second radio signal in a second frequency band different from the first frequency band, and a filter connected to the radio communication unit via a switch and configured to attenuate the first radio signal, the method comprising the steps of:
   determining a condition of communication data transmitted via the radio communication unit; and
   disconnecting the filter from the radio communication unit by operating the switch, on the basis of the condition of the communication data determined in the step of determining.

2. A filter activation control method using a radio communication unit configured to transmit a first radio signal in a first frequency band and also to receive a second radio signal in a second frequency band different from the first frequency band, and a filter connected to the radio communication unit via a switch and configured to attenuate the first radio signal, the method comprising the steps of:
   determining a condition of communication data transmitted or received via the radio communication unit; and
   disconnecting the filter from the radio communication unit by operating the switch, on the basis of the condition of the communication data determined in the step of determining, wherein
   in the step of determining, a transmission rate of the communication data is determined, and
   in the step of disconnecting, the filter is disconnected from the radio communication unit by operating the switch, on the basis of the transmission rate determined in the step of determining.

3. A filter activation control method using a radio communication unit configured to transmit a first radio signal in a first frequency band and also to receive a second radio signal in a second frequency band different from the first frequency band, and a filter connected to the radio communication unit via a switch and configured to attenuate the first radio signal, the method comprising the steps of:
   determining a condition of communication data transmitted or received via the radio communication unit; and
   disconnecting the filter from the radio communication unit by operating the switch, on the basis of the condition of the communication data determined in the step of determining, wherein
   in the step of determining, a transmission rate of the communication data is determined,
   in the step of disconnecting, the filter is disconnected from the radio communication unit by operating the switch, on the basis of the transmission rate determined in the step of determining, and
   the filter is disconnected from the radio communication unit in the step of disconnecting, in a case where a transmission power value of the first radio signal exceeds a predetermined threshold value associated with the transmission rate determined in the step of determining.

4. A filter activation control method using a radio communication unit configured to transmit a first radio signal in a first frequency band and also to receive a second radio signal in a second frequency band different from the first frequency band, and a filter connected to the radio communication unit via a switch and configured to attenuate the first radio signal, the method comprising the steps of:
   determining a condition of communication data transmitted via the radio communication unit; and
   disconnecting the filter from the radio communication unit by operating the switch, on the basis of the condition of the communication data determined in the step of determining, wherein
   in the step of determining, a determination is made as to whether or not a priority control for the communication data is applied, and
   in the step of disconnecting, the filter is disconnected from the radio communication unit by operating the switch, on the basis of the determination made as to whether or not the priority control is applied in the step of determining.

5. A filter activation control method using a radio communication unit configured to transmit a first radio signal in a first frequency band and also to receive a second radio signal in a second frequency band different from the first frequency band, and a filter connected to the radio communication unit via a switch and configured to attenuate the first radio signal, the method comprising the steps of:
   determining a condition of communication data transmitted or received via the radio communication unit; and
   disconnecting the filter from the radio communication unit by operating the switch, on the basis of the condition of the communication data determined in the step of determining, wherein
   in the step of determining, a determination is made as to whether or not a priority control for the communication data is applied,
   in the step of disconnecting, the filter is disconnected from the radio communication unit by operating the switch, on the basis of the determination made as to whether or not the priority control is applied in the step of determining, and
   the filter is disconnected from the radio communication unit in the step of disconnecting, in a case where a reception power value of the first radio signal exceeds a predetermined threshold value associated with the determination made as to whether or not the priority control is applied in the step of determining.

* * * * *